July 10, 1945.   H. F. WATERS   2,380,134
METHOD OF PRESERVING FOODS IN FLEXIBLE-WALLED FLUID-TIGHT BAGS
Filed Oct. 22, 1940
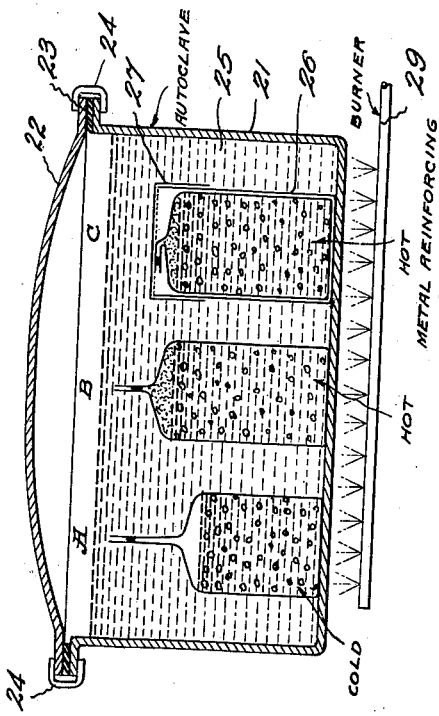
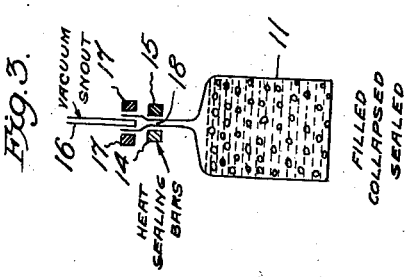
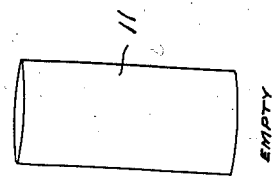
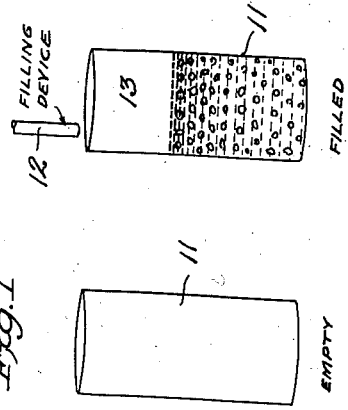
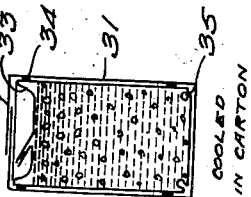
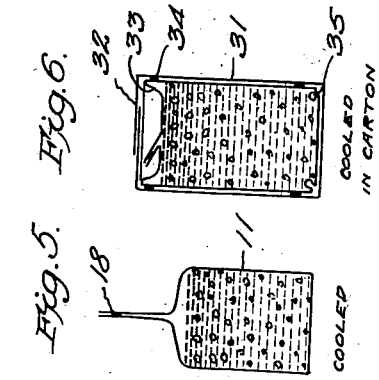
INVENTOR.
HARRY F. WATERS
BY Nicholas Langer
ATTORNEY Patented July 10, 1945

2,380,134

UNITED STATES PATENT OFFICE 2,380,134

METHOD OF PRESERVING FOODS IN FLEXIBLE-WALLED FLUID-TIGHT BAGS

Harry F. Waters, New York, N. Y.

Application October 22, 1940, Serial No. 362,182

6 Claims. (Cl. 99—182)

The present invention relates to the art of preserving and sterilizing foods and, more particularly, to a novel method of preserving foodstuffs in flexible-walled containers.

As those skilled in the art know, at present principally metal cans and glass jars are used for preserving and distributing perishable foods in unitary quantities. The procedure generally followed involves the preliminary steps of cleaning, preparing and cooking the foods. Thereafter the prepared foods are introduced into a can or jar and are sealed. The filled and sealed rigid-walled containers are subjected to sterilizing temperatures which destroy the microorganisms present in the foods and prevent subsequent deterioration or spoiling. The disadvantages of this conventional procedure principally resided in the high price and great weight of the containers. Moreover, these rigid-walled containers required the same space in empty condition as in filled condition, thereby greatly increasing the cost of shipping particularly when the manufacturer of the containers was located at some distance from the canning station. A further disadvantage of these rigid-walled containers was their relatively high price which was all out of proportion with respect to the price of the foods to be packaged.

Recently, flexible-walled, hermetically sealed, fluid-tight bags or containers were used with excellent results and to an increasing extent in the packaging art for preserving and distributing foodstuffs of various character. These containers were generally constituted of flexible, fluid-tight and thermoplastic materials such as a sheeted rubber hydrochloride product known as Pliofilm and various sheeted synthetic resins including vinyl resins, and the like, which were either used in the form of integral sheets or were laminated with sheets of a non-fusible, flexible material such as paper or metal foil. These containers were formed from webs or sheets of the flexible material by means of heat-sealing operations and were frequently combined with cartons to reinforce the same. The advantage of these collapsible packaging media was their low price, light weight and the possibility of shipping them in collapsed condition in which they required very little space.

While these containers provided good results, some difficulty was experienced in employing them for foods of the type which had to be sterilized prior to sealing the containers. This difficulty was due to the relatively low strength of the flexible-walled containers which were unable to withstand substantial internal pressures. When it was attempted to expose these flexible-walled containers after sealing to sterilizing temperatures and pressures, the inner pressure of the vapors developed during sterilizing would rupture the seams or the walls of the containers. Therefore, it was resorted to cooking and sterilizing the foods in substantial batches and in a metal receptacle and thereafter introducing them, while still hot, into the flexible walled container which was sealed immediately thereafter. This mode of operation had the disadvantage that between the time of filling and sealing the containers microorganisms frequently would find their way into the packaged goods and would exert their deleterious influence thereon, so that the contents of some of the packages was contaminated and spoiled. Although various suggestions and proposals were made to carry out the sterilizing process in the sealed condition of the flexible-walled containers, none as far as I am aware, of these prior suggestions and proposals was completely satisfactory and successful in practical operation due to the fact that the relatively weak seam structure of the flexible-walled containers was incapable of resisting the inner pressures developed in the foods during the sterilizing process.

I have discovered a simple and effective method of solving the outstanding problem.

It is an object of the present invention to provide a method of preserving foodstuffs in hermetically sealed flexible-walled containers which completely eliminates the disadvantages and inconveniences of conventional procedures.

It is another object of the present invention to provide a novel method of preserving and sterilizing foodstuffs in sealed flexible-walled containers which involves the provision of a collapsed vapor space initially provided above the level of the packaged and sealed foods and which is capable of expansion under the effect of the inner vapor pressure during the process of heat sterilization.

It is a further object of the present invention to provide a method of sterilizing perishable foods sealed in the cold state within the container and exposed to an external restraining and balancing pressure to prevent rupturing of the container under the inner pressure of the contents while they are being sterilized.

The invention also contemplates a method of preserving and sterilizing foodstuffs in flexible-walled containers which is simple in character and which may be readily practiced on a practical and industrial scale at a low cost.

Other and further objects and advantages of the invention will become apparent from the following description taken in conjunction with the accompanying drawing in which:

Fig. 1 illustrates a diagrammatic view of a flexible-walled container employed in the method of the invention;

Fig. 2 depicts a similar sectional view of the container after it has been filled with the contents to be preserved;

Figure 3 shows a similar view of the container after the air space above the level of the contents has been eliminated and the container has been sealed at a substantial distance above such level;

Fig. 4 is a vertical sectional view of a treating receptacle for simultaneously exposing a plurality of flexible-walled containers to sterilizing conditions;

Fig. 5 is a diagrammatic sectional view of a container after it has been sterilized and cooled;

Fig. 6 illustrates a similar sectional view of the sterilized and sealed container inserted into a reinforcing carton or case;

Fig. 7 is a vertical sectional view somewhat diagrammatic in character of an empty container or bag combined with a suitable reinforcing carton.

Broadly stated, according to the principles of my invention, I provide a flexible-walled bag or container constituted of a material which is fluid-tight and fusible or thermoplastic on at least the inner face thereof. Examples of such materials are substances sold in the trade under the names Pliofilm, Koroseal, Vinylite, and the like. In addition to these materials, a large number of synthetic resins are available at present on the market having all of the desirable properties of forming thin, strong and fluid-tight films or sheets capable of being autogeneously welded or fused together by the application of heat and pressure. These materials may be applied as integral sheets or they may be laminated or bonded with non-fusible sheet materials, preferably paper or metal foil. These containers are filled with the materials to be preserved in the cold condition and the container is hermetically sealed at a substantial distance above the liquid level, care being taken that the portions of the container above the level of the contents should be collapsed or otherwise freed from gases. This can be accomplished either by mechanically collapsing such top portions of the container immediately prior to sealing or by connecting the mouth of the bag or container to a vacuum conduit or snout through which the atmosphere within the container may be withdrawn prior to sealing and thus the upper portions of the walls may be caused to collapse about the contents. The containers thus freed from excess air and provided with an inner potential expansion space are introduced into a treating receptacle in which the properly sealed container may be subjected to sterilizing temperatures. This may be accomplished, for example, by introducing the containers into the receptacle filled with a suitable fluid or liquid, such as water, in which the containers are submerged.

I have found that when a receptacle of this type is closed and is subjected to sterilizing temperatures, provided that the liquids within and surrounding the containers have substantially the same vaporizing points, internal and external pressure on the flexible-walled container during sterilizing will compensate for each other so that the walls and seams of the containers will remain substantially free from stresses. While no difficulty is experienced in providing materials for the containers which are not affected detrimentally by contact with water or other liquids at sterilizing temperatures, I likewise contemplate insertion of the bags into individual reinforcing or protective shells to prevent direct contact of the sterilizing medium with the walls of the containers as this will be set forth more fully hereinafter.

In the foregoing it has been stated that since the filled and sealed flexible-walled container is preferably processed in such a manner that substantially the same pressure is maintained on the outside of the container, the seams and walls of the container cannot be subjected to a disrupting pressure. However, even in this case it is advantageous to provide an expansion space in the container, because this protects the container in case transitory differences in pressure and in temperature develop between the contents and the fluid heating medium. This might especially occur during the early stages of the sterilizing process, and the expansion space incorporated into the container provides additional protection for this possibility.

Referring now more particularly to the drawing, Fig. 1 illustrates diagrammatically a fluid-tight bag or envelope 11 in the unfilled condition. As it has been pointed out in the foregoing, this bag is preferably constituted of a material which is fusible on at least the inner surface thereof so that it may be hermetically sealed after filling by applying heat and pressure to a transverse strip thereof.

The first step in carrying my method into practice is to fill this bag by means of a suitable filling device 12 with the food or other contents to be packaged. This food may be previously prepared but is generally in a cold or only moderately warm state. It is to be noted that the filling has to be carried out to such a level that a very substantial head space 13 is retained at the top, the object of which will presently appear. After the bag has been filled, the upper portions of the bag defining the head space are brought together into a face to face position and a seal 18 is applied thereto at a substantial distance from the level of the contents by means of heat sealing bars 14 and 15, one of which may be constituted of metal and the other may be constituted of an elastic material, such as rubber. Thus, it will be seen that a very substantial portion of the bag is available for subsequent expansion to take up vapors produced during the following cooking and sterilizing steps. As an alternative, a vacuum conduit or snout 16 may be inserted into the collapsed mouth portions of the bag and may be gas-tightly connected to such portions by means of resilient pressure members or jaws 17. Through vacuum snout 16 the air or other gases present in head space 13 may be withdrawn so that the confining walls of the bag are collapsed. This provides substantially the same result as mechanical collapsing of the upper portions of the bag walls and has the advantage of withdrawing practically all of the gases from the contents so that an even greater space is available for subsequent expansion. After this vacuuming step, a heat seal 18 may be applied immediately below the vacuum snout by means of heat sealing bars 14 and 15.

The following cooking and sterilizing step is preferably carried out in a closed vessel such as receptacle 21 shown in Fig. 4. This receptacle has a cover 22 and a gasket 23 of annular character which permits fluid-tight and vapor-tight closure of the receptacle by applying clamps 24 to the flange-like extensions of receptacle and cover. Within this receptacle there is a body 25 of a suitable heat transfer liquid which in the simplest case may be water. A gas burner 29 is provided for heating the receptacle and its contents to a predetermined treating temperature although, of course, any other appropriate heating device may be employed with equal or similar results. The filled and sealed packages are introduced into the body of liquid in receptacle 21 so that they are completely covered by the liquid. The appearance of these sealed bags in the cold and untreated condition is represented by reference character A in Fig. 4. As it appears from the drawing, bag A has a substantially collapsed head space between seal 18 and the level of the contents, this space being capable of subsequent expansion. Reference character B denotes the same bag after it has been heated to the desired cooking and sterilizing temperature which is generally within the range of about 200° to about 300° F. It will be noted that when subjected to such temperatures, the liquid portion of the contents will partially vaporize and will expand the normally collapsed head space of the sealed bag. I have found that as a result of the provision of this substantial head space in the sealed bag, which subsequently may be filled out by the vapors, the seam structure and the walls of the bag are not ruptured by the inner pressure and that the bag may be subjected to such sterilizing temperatures without any danger. This effect is still further supplemented by the vapor pressure of the treating or heat transfer liquid 25 which externally acts on the flexible-walled bag. Since most foods are preserved in an aqueous liquid, it is desirable to provide an aqueous liquid of similar character within the receptacle. It may be assumed that the temperatures in the body of liquid 25 and of the liquid within the sealed bag are substantially the same and will have substantially the same vapor pressure within a wide range of temperatures. Thus, the sealed bag will be subjected to the same pressure on its outer and on its inner surface so that these outer and inner pressures will compensate for each other and very considerable treating temperatures and pressures may be applied on the contents desired to be cooked and sterilized without exposing the bag itself to any appreciable strain. This is a very surprising discovery since heretofore it was generally believed in the art that rigid-walled containers of great mechanical strength are necessary for carrying out a sterilizing process. I have found that relatively weak, flexible-walled, sealed containers are capable of being subjected to sterilizing conditions without any difficulty provided the principles of my novel method are carefully followed.

Of course, care must be taken to use such materials for the bags which are not injured by contact with the treating liquid 25 at the sterilizing temperatures. At present a number of such materials are available such as various synthetic resins, particularly vinyl resins. However, if desired, additional protection for the flexible-walled bag may be provided in the form of a second bag, shell, or similar protective element, which completely surrounds the bag and prevents direct contact of the outer walls of the bag with the body of liquid 25. This protective element may be in the simplest case a rubber bag or container or a rigid metallic can or shell of the type shown in Fig. 4 and denoted by reference character C. This shell may comprise a lower or body portion 26 and a tight-fitting sliding cover 27. Since the pressure within and without this protective shell is substantially the same, it is generally not necessary to provide any locking device to connect shell and cover together, although such member in the form of a clamp or latch may be provided, if desired.

After the sealed bags have been subjected to the sterilizing temperatures and pressures for a predetermined length of time, they are removed from receptacle 21 and are allowed to cool to room temperature. After cooling, the hot vapors present in the head space of the bag condense and the external atmospheric pressure will cause collapsing of the top portions of the walls as this will be best observed in Fig. 5. This bag may now be inserted into a carton of such dimensions that the bag walls will be supported by the inner walls of the carton throughout the entire surface thereof whereby an extremely strong reinforced structure is obtained. Experience has demonstrated that a structure of the described character and comprising an inner fluid-tight bag and an outer reinforcing carton completely supporting said bag has a very great resulting strength and may be subjected to rough handling incident to shipping, distribution and storage customary in the retail trade without any danger of leakage.

In the foregoing, I have disclosed a preferred embodiment of my method in which flexible-walled bags of a fluid-tight character are filled with the contents, sealed at a substantial distance above the level of the contents, are subjected to sterilizing temperatures and pressures in a heat transfer liquid and are subsequently cooled and slipped into a container for final distribution. It is also possible, however, to insert the bag into a carton prior to the cooking or sterilizing process, care being taken that the carton is not exposed to the detrimental effect of direct contact with hot liquids or that the carton is constituted of such material which is capable of withstanding the effects of a hot and liquid sterilizing medium. In this case it is preferred to provide the carton and the bag in the form of a pre-fabricated unit which may be shipped and stored in the collapsed condition and may be erected in a single operation to provide a fluid-tightly lined packaging medium ready for filling. A pre-fabricated container of this type is diagrammatically illustrated in Fig. 7 showing a carton 31 having closure flaps 32 and a fluid-tight bag 33 adhesively secured thereto by means of spots or lines of adhesive 34. It is essential that the inner bag should have linear dimensions which are greater than the corresponding dimensions of the carton. This is diagrammatically shown by inwardly protruding portions 35 in Fig. 7 and has the result that after filling the bag is capable of limited expansion so that it is fully supported by the inner walls of the carton. After the carton and the filled bag have been subjected to the sterilizing operation described in the foregoing, the structure shown in Fig. 6 is obtained, which is self-explanatory.

It will be noted that my invention provides important new results and advantages in the art of preserving and packaging foodstuffs. First of all, my novel method makes it possible to employ very inexpensive flexible-walled bags with or without a reinforced carton for packaging various commodities, especially perishable foods.

It is also to be observed that my method makes it possible to sterilize perishable foods within a hermetically sealed flexible-walled container by exposing such flexible-walled bags or containers to sterilizing temperatures and pressures within a heat transfer medium and without the danger of injuring the relatively weak packages.

Although the present invention has been described in connection with a preferred embodiment thereof, variations and modifications may be resorted to by those skilled in the art without departing from the principles of the present invention. I consider all of these variations and modifications to be within the true spirit and scope of my invention as disclosed in the foregoing description and defined by the appended claims.

I claim:

1. The method of preserving foods in flexible-walled bags which comprises introducing food to be preserved into a flexible-walled bag fluid-tight and heat-fusible on its inner surface at least, collapsing the portions of said bag above the level of the contents, hermetically heat-sealing the mouth of said bag thereby providing a substantial collapsed head space capable of subsequent expansion upon increase of the inner pressure within said bag, externally exposing said filled and sealed bag to contact with a fluid heat transfer medium to raise the temperature of the contents to sterilizing temperatures whereby the gases produced within said bag incident to sterilizing will be taken up by expanding said normally collapsed head space without exerting any appreciable pressure on the seam structure, and then causing cooling of said bag and contents to room temperature to collapse said head space into its original position.

2. The method of preserving foods in flexible-walled bags which comprises introducing food to be preserved into a flexible-walled fluid-tight bag fluid-tight and fusible on at least the inner face thereof, collapsing the mouth and then hermetically heat-sealing said bag, and externally exposing said sealed bag to contact with a confined body of heat transfer liquid to raise the temperature of the contents to desired treating temperatures whereby the pressure internally and externally exerted on the walls of said flexible-walled bag will be substantially equal and will prevent production of excessive stresses in the material of said bag.

3. The method of preserving foods in flexible-walled bags which comprises introducing food to be preserved into a flexible-walled fluid-tight bag, collapsing the mouth and then hermetically sealing said bag, submerging said filled and sealed bag in a confined body of heat transfer liquid, and heating said body of liquid to heating and sterilizing temperatures communicated to the contents of said bag whereby the pressure internally and externally exerted on the walls of said bag will be substantially equal and will prevent production of excessive stresses in the material of said bag, said bag being constituted of a material which is not detrimentally affected by direct contact with the heat transfer liquid.

4. The method of preserving foods in flexible-walled bags which comprises introducing food to be preserved into a flexible-walled fluid-tight bag, collapsing the mouth and then hermetically sealing said bag at a substantial distance above the level of the contents to provide a collapsed head space capable of expansion upon increase of the internal pressure, submerging said filled and sealed bag in a confined body of heat transfer liquid, and heating said body of heat transfer liquid to cooking and sterilizing temperatures communicated to the contents of said bag whereby the pressure internally and externally exerted on the walls of said bag will be substantially equal and will prevent production of excessive stresses in the material of said bag, said bag being constituted of a material which is not detrimentally affected by direct contact with the heat transfer liquid.

5. The method of preserving foods in flexible-walled bags which comprises introducing food to be preserved and including an aqueous liquid into a flexible-walled fluid-tight bag, collapsing the mouth and then hermetically sealing said bag so as to leave a collapsed head space above the level of the contents, placing said bag into a closed receptacle containing a body of aqueous heat transfer liquid, heating said body of liquid to cooking and sterilizing temperatures communicated to the contents of said bag whereby the pressure internally and externally exerted on the walls of said bag will be substantially equal and will prevent production of excessive stresses in the material of said bag, and then removing the treated bag from said receptacle to obtain a hermetically sealed package containing a unitary quantity of sterilized food.

6. The method of preserving foods in flexible-walled bags which comprises introducing food to be preserved into a flexible-walled fluid-tight bag, collapsing the mouth and then hermetically sealing said bag above the level of the contents, exposing said filled and sealed bag to the heating effect of a confined body of heat transfer liquid to heat said bag to cooking and sterilizing temperatures, and interposing a protective member between said bag and said body of liquid to prevent direct contact thereof.

HARRY F. WATERS.